US012478265B2

(12) United States Patent
Woehrle et al.

(10) Patent No.: US 12,478,265 B2
(45) Date of Patent: Nov. 25, 2025

(54) INFLATION APPARATUS FOR AN INFLATION-BASED NON-INVASIVE BLOOD PRESSURE MONITOR AND A METHOD OF OPERATING THE SAME

(71) Applicant: KONINKLIJKE PHILIPS N.V., Eindhoven (NL)

(72) Inventors: Dieter Woehrle, Waiblingen (DE); Lars Schmitt, Aachen (DE); Maarten Petrus Joseph Kuenen, Veldhoven (NL); Paul Aelen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 801 days.

(21) Appl. No.: 16/647,340

(22) PCT Filed: Sep. 7, 2018

(86) PCT No.: PCT/EP2018/074151
§ 371 (c)(1),
(2) Date: Mar. 13, 2020

(87) PCT Pub. No.: WO2019/052918
PCT Pub. Date: Mar. 21, 2019

(65) Prior Publication Data
US 2021/0022627 A1    Jan. 28, 2021

(30) Foreign Application Priority Data
Sep. 14, 2017    (EP) .................................... 17191091

(51) Int. Cl.
*A61B 5/021*    (2006.01)
*A61B 5/022*    (2006.01)
(Continued)

(52) U.S. Cl.
CPC ...... *A61B 5/02141* (2013.01); *A61B 5/02225* (2013.01); *A61B 5/02233* (2013.01); *A61B 5/0235* (2013.01); *A61B 5/02427* (2013.01)

(58) Field of Classification Search
CPC ............ A61B 5/02141; A61B 5/02225; A61B 5/02233; A61B 5/0235; A61B 5/02427; A61B 5/0225; A61B 5/022
See application file for complete search history.

(56) References Cited

U.S. PATENT DOCUMENTS 3,905,354 A * 9/1975 Lichowsky ............ A61B 7/045
600/494
4,493,326 A * 1/1985 Hill ..................... A61B 5/02208
D24/165
(Continued)

FOREIGN PATENT DOCUMENTS

| JP | 2002034938 A | 2/2002 |
| JP | 2008228916 A | 10/2008 |

(Continued)

OTHER PUBLICATIONS

International Search Report and Written Opinion, International Application No. PCT/EP2018/074151, Mailed on Nov. 6, 2018.
(Continued)

*Primary Examiner* — Justin Xu

(57) ABSTRACT

According to an aspect there is provided an inflation apparatus (10) for use with an inflation-based non-invasive blood pressure, NIBP, measurement apparatus, the inflation apparatus comprising: an outlet (110) configured to be coupled to a cuff of the inflation-based NIBP measurement apparatus; a pump (120) configured to output a flow of gas at an output flow rate; a valve (130) disposed along a flow path between the pump and the outlet to selectively pass part of the flow of gas output by the pump; and a control unit (140) config-
(Continued)

ured to control the flow resistance of the valve to provide a flow of gas to the outlet at a required flow rate for inflating the cuff.

20 Claims, 6 Drawing Sheets

(51) Int. Cl.
  *A61B 5/0225* (2006.01)
  *A61B 5/0235* (2006.01)
  *A61B 5/024* (2006.01)

(56) References Cited

U.S. PATENT DOCUMENTS

| | | | |
|---|---|---|---|
| 4,567,899 A | 2/1986 | Kamens et al. | |
| 4,924,873 A | 5/1990 | Sorensen | |
| 6,171,254 B1 | 1/2001 | Skelton | |
| 8,206,310 B2 | 6/2012 | Takahashi | |
| 2003/0060720 A1 | 3/2003 | Lee et al. | |
| 2006/0052712 A1* | 3/2006 | Poliac | A61B 5/02007 600/490 |
| 2006/0253150 A1* | 11/2006 | McEwen | A61B 5/0261 606/202 |
| 2007/0032729 A1* | 2/2007 | Fortin | A61B 5/02255 600/490 |
| 2011/0282223 A1 | 11/2011 | Sano et al. | |
| 2012/0059267 A1 | 3/2012 | Lamego | |
| 2012/0265240 A1* | 10/2012 | Ganske | A61H 9/0078 606/202 |
| 2012/0330112 A1 | 12/2012 | Lamego et al. | |
| 2016/0220195 A1 | 8/2016 | Abu-Tarif et al. | |
| 2017/0156603 A1 | 6/2017 | Sato et al. | |
| 2017/0238824 A1 | 8/2017 | Woerlee et al. | |
| 2018/0023548 A1 | 1/2018 | Øllgaard | |
| 2018/0132732 A1* | 5/2018 | Lin | F04B 49/20 |
| 2018/0296101 A1* | 10/2018 | Kubo | A61B 5/0225 |

FOREIGN PATENT DOCUMENTS

| | | |
|---|---|---|
| KR | 20130082036 A | 7/2013 |
| WO | 2007032869 A2 | 3/2007 |
| WO | 2016030232 A1 | 3/2016 |

OTHER PUBLICATIONS

Nihon Kohden, https://www.nihonkohden.com/, Accessed Mar. 11, 2020.

Welch Allyn, "Connex® ProBP™ 3400 Digital Blood Pressure Device", 2014.

Oken, http://okenseiko.com/, Accessed Mar. 11, 2020.

Wang, S. et al. (2015). Digital Control Method of Volume Clamp Method. International Conference on Mechatronics, Electronic, Industrial and Control Engineering (MEIC 2015), CI(Meic), 691-694.

* cited by examiner

INFLATION APPARATUS FOR AN INFLATION-BASED NON-INVASIVE BLOOD PRESSURE MONITOR AND A METHOD OF OPERATING THE SAME

This application is the U.S. National Phase application under 35 U.S.C. § 371 of International Application No. PCT/EP2018/074151, filed on 7 Sep. 2018, which claims the benefit of European Application Serial No. 17191091.2, filed 14 Sep. 2017. These applications are hereby incorporated by reference herein.

FIELD OF THE INVENTION

The invention relates to an inflation apparatus for an inflation-based non-invasive blood pressure measurement apparatus and a method of operating the same, and in particular relates to providing an inflation apparatus that is suitable for use with a large range of different inflatable cuffs varying in sizes and materials.

BACKGROUND TO THE INVENTION

Arterial blood pressure (BP) is one of the most important vital signs and is widely used in clinical practice. Non-invasive arterial blood pressure (NIBP) is usually measured by slowly varying the pressure in a cuff that is wrapped around an upper arm of a subject. The BP is determined either by measuring sound distal from the cuff (the auscultatory method, based on Korotkoff sounds) or by measuring pressure pulsations in the cuff caused by volume pulsations of the arm and brachial artery and extracting features from the envelope of these pressure pulses (the oscillometric method). The oscillometric method is easily automated and is widely used.

The principle behind a typical auscultatory or oscillometric method is illustrated by FIG. 1 and FIG. 2, which show respectively pressure applied to the cuff versus time and pressure measured at the inflatable cuff versus time. The y-axis shows cuff pressure, and the x-axis shows time.

To perform a deflation based NIBP measurement using either the auscultatory method or the oscillometric method, a cuff is inflated around the upper arm of a subject until all blood flow is occluded. Subsequently, the cuff pressure is slowly decreased stepwise as shown in FIG. 1, or linearly in other types of measurement techniques. Signals measured during the decrease of cuff pressure are then used to determine systolic blood pressure (SBP, i.e. maximum blood pressure during the heart cycle) and diastolic blood pressure (DBP, i.e. minimum blood pressure during the heart cycle). During this process, the subject, e.g. a patient, is likely to experience discomfort and this is represented by the area under the line in FIG. 1. The product of time and pressure results in a level of discomfort—in other words, a high pressure for a long time is uncomfortable for the subject, and a lower pressure could also result in the same level of the discomfort if applied for a longer period.

As illustrated in FIG. 2, in the auscultatory method, SBP and DBP are determined from the onset and disappearance of the Korotkoff sounds, which can be heard using a stethoscope placed over the brachial artery distal to the cuff by a healthcare professional. In the oscillometric method, SBP and DBP are determined from the cuff pressure oscillations that are observed. The amplitude of these oscillations is the largest when the cuff pressure is close to the mean arterial blood pressure. SBP and DBP are typically determined as the cuff pressure where the oscillation amplitude is within a specific percentage range (characteristic ratio) of the peak oscillation amplitude. Common characteristic ratios are around 70% to 80% for DBP and around 50% to 60% for SBP.

One of the problems with deflation-based techniques such as the one described above is the discomfort introduced to the subject (represented by the area under the line in FIG. 1). Pressures above a certain level can cause discomfort and even pain, either due to the pressure exerted by the cuff itself or due to the build-up of venous blood (venous pooling) in the part of the limb distal to the cuff. The longer these pressures are applied to the subject, the more discomfort is caused to the subject.

Another problem with deflation-based NIBP measurements is the long duration of the measurement itself. Deflation-based NIBP measurements typically take around 40 seconds to complete a single measurement. This duration can be perceived as too long by the subject (e.g. a patient) due to the discomfort caused by the pressure level, and it can also affect the workflow of medical personnel, who usually carry out blood pressure measurements for multiple patients. Moreover, the inherent variability of blood pressure over time can distort a blood pressure measurement during deflation of the cuff.

The comfort of the NIBP measurement can be improved in any or all of three areas: the total measurement time (where a reduction is desired), the maximum cuff pressure reached (where a lower maximum pressure is desired), and the integral of cuff pressure over time (where a smaller integral is desired). Of course, this increase in comfort should not come at the expense of the accuracy of the NIBP measurement beyond acceptable limits.

In addition to the types of measurement techniques described above in which the BP is measured during deflation of the cuff, apparatuses have been developed that can measure the BP while the cuff is being inflated. This can reduce the total measurement time (in some cases to around 20 seconds), since deflation can occur relatively quickly once the BP measurement has been obtained, and therefore can result in a measurement that is more comfortable for the subject (as shown by the dotted line in FIG. 1).

One existing measurement apparatus uses a fixed flow (i.e. fixed mL/s, variable mmHg/s) to inflate a cuff and another apparatus uses a fixed pressure rate (i.e. fixed mmHg/s, variable mL/s). The fixed flow solution results in a device only functional for a small range of cuffs, since the inflation may be too fast for smaller cuffs (i.e. too little number of oscillations to obtain an accurate estimate of SBP and DBP) and the measurement becomes slow for larger cuffs. The fixed pressure rate (i.e. a certain increase of pressure over a fixed period of time) solution addresses these issues by changing the flow for a certain desired pressure rate. However, a particular issue with this solution is that to be compatible for use with a large range of cuffs, a wide range of flows has to be generated and it is difficult for a normal pump to generate a wide range of flows which span the range from neonatal cuffs to thigh cuffs. If a pump configured to generate a high maximum flow is chosen, it might not be able to generate low flows for small cuffs in an accurate way. Similarly, if a pump configured to generate a lower maximum flow is chosen, it might not be able to generate high flows required for larger cuffs.

Furthermore, there are some other problems associated with the use of a particular pump to inflate a blood pressure cuff. For example, at some desired flows there may be pump stalling, i.e. no pumping at all by the pump. Another problem would be the pump inducing oscillations that are difficult to distinguish from arterial oscillations that are to be measured, which is an issue particularly common with pumps configured to generate low flows, as the induced oscillations might be in the same frequency band as the arterial oscillations. This causes difficulty in the separation of signals and can result in unwanted artefacts in the detected signals which reduces the accuracy of the BP measurements.

SUMMARY OF THE INVENTION

One of the attempts to address the issues mentioned above is to modify the components in a diaphragm pump used in the BP measurement apparatus so as to allow the flow output of the inflow and/or outflow valves of the pump to be controlled independently with respect to the rotational frequency of the motor of the pump. This can be done by partially blocking the inflow and/or outflow of the pump by closing the inlet and/or outlet of the diaphragm chamber during the time it is connected to the atmosphere (inlet) or the counter pressure (outlet). A disadvantage of this approach is that an intricate modification of the pump is required, which involves additional electrical components and dedicated control techniques.

Therefore there is a need for a robust inflation apparatus for use in an inflation-based NIBP measurement apparatus and method of operating the same that addresses all the issues discussed above and at the same time does not involve complex adaptations of existing pumps or elaborate controls.

According to a first aspect, there is provided an inflation apparatus for use with an inflation-based non-invasive blood pressure NIBP measurement apparatus, the inflation apparatus comprising: an outlet configured to be coupled to a cuff of the inflation-based NIBP measurement apparatus; a pump configured to output a flow of gas at an output flow rate; a valve disposed along a flow path between the pump and the outlet to selectively pass part of the flow of gas output by the pump; and a control unit configured to control the flow resistance of the valve to provide a flow of gas to the outlet at a required flow rate for inflating the cuff.

In some embodiments, the valve may be a leak valve that is configured to pass a part of the flow of gas output by the pump to the atmosphere when the leak valve is opened, wherein a flow resistance of the leak valve may be fixed and the control unit may be configured to control the switching of the leak valve and to control the pump to adjust the output flow rate of the pump to provide a flow of gas to the outlet at the required flow rate.

In some embodiments, the control unit may be configured to open the leak valve when the required flow rate is lower than a minimum flow rate of the pump, so as to pass a part of the flow of gas output by the pump to the atmosphere.

In some embodiments, the control unit may be configured to close the leak valve and adjust the output flow rate of the pump to the required flow rate when the required flow rate is above a minimum flow rate of the pump.

In some embodiments, the control unit may be configured to open the leak valve based on a compliance value, so as to pass a part of the flow of gas output by the pump to the atmosphere.

In some embodiments, the valve may be a proportional valve that is configured to pass a part of the flow of gas output by the pump to the atmosphere when the proportional valve is opened, and wherein the control unit may be configured to control the flow resistance of the proportional valve to provide a flow of gas to the outlet at the required flow rate.

In some embodiments, the control unit may be configured to open the proportional valve when the required flow rate is lower than the output flow rate of the pump so as to pass a part of the flow of gas output by the pump to the atmosphere, wherein the control unit may be configured to control the flow resistance of the proportional valve so as to provide a flow of gas to the outlet at the required flow rate.

In some embodiments, the control unit may be configured to close the proportional valve when the required flow rate is higher than the minimum output flow rate of the pump.

In some embodiments, the control unit may be configured to open the proportional valve based on a compliance value, so as to pass a part of the flow of gas output by the pump to the atmosphere.

In some embodiments, the output flow rate of the pump may be fixed.

In other embodiments, the control unit may be configured to control the pump to adjust the output flow rate of the pump.

In some embodiments, the inflation apparatus according may further comprise a gas reservoir disposed to receive the flow of gas output by the pump and to provide a flow of gas via the valve to the outlet when the valve is opened by the control unit, wherein the valve may be a proportional valve and the control unit may be configured to control the flow resistance of the proportional valve to provide a flow of gas to the outlet at the required flow rate.

In some embodiments, the required flow rate may be determined based on at least one of a rate of change of pressure in the cuff and a compliance value.

In some embodiments, the inflation apparatus may further comprise a release valve in fluid communication with the inflatable cuff for selectively deflating the cuff.

According to a second aspect, there is provided an inflation-based non-invasive blood pressure NIBP measurement apparatus comprising: an inflation apparatus according to the first aspect, an inflatable cuff for placement around a body part of a subject, the inflatable cuff being coupled to the outlet of the inflation apparatus; and a sensor configured to measure arterial oscillations in the body part of the subject as the cuff is being inflated by the inflation apparatus; wherein the control unit of the inflation apparatus or a processing unit in the inflation-based NIBP measurement apparatus is configured to receive measurements of arterial oscillations from the sensor and to determine the blood pressure of the subject based on the received measurements.

According to a third aspect, there is provided a method of controlling an inflation apparatus for use with an inflation-based non-invasive blood pressure NIBP measurement apparatus, the inflation apparatus comprising an outlet configured to be coupled to a cuff of the inflation-based NIBP measurement apparatus; a pump configured to output a flow of gas at an output flow rate; a valve disposed along a flow path between the pump and the outlet to selectively pass a part of the flow of gas output by the pump, the method in a control unit of the inflation apparatus comprising: controlling the flow resistance of the valve to provide a flow of gas to the outlet at a required flow rate for inflating the cuff.

In some embodiments, the valve may be a leak valve with a fixed flow resistance, and the method may further comprise passing, by the leak valve, a part of the flow of gas output by the pump to the atmosphere when the leak valve is opened, and controlling the switching of the leak valve and controlling the pump to adjust the output flow rate of the pump to provide a flow of gas to the outlet at the required flow rate.

In some embodiments, the method may further comprise opening the leak valve when the required flow rate is lower than a minimum flow rate of the pump, so as to pass a part of the flow of gas output by the pump to the atmosphere.

In some embodiments, the method may further comprise closing the leak valve and adjusting the output flow rate of the pump to the required flow rate when the required flow rate is above a minimum flow rate of the pump.

In some embodiments, the method may further comprise opening the leak valve based on a compliance value, so as to pass a part of the flow of gas output by the pump to the atmosphere.

In some embodiments, the valve may be a proportional valve, and the method may further comprise to passing, by the proportional valve, a part of the flow of gas output by the pump to the atmosphere when the proportional valve is opened, and controlling the flow resistance of the proportional valve to provide a flow of gas to the outlet at the required flow rate.

In some embodiments, the method may further comprise opening the proportional valve when the required flow rate is lower than the output flow rate of the pump so as to pass a part of the flow of gas output by the pump to the atmosphere, and controlling the flow resistance of the proportional valve so as to provide a flow of gas to the outlet at the required flow rate.

In some embodiments, the method may further comprise closing the proportional valve when the required flow rate is higher than the minimum output flow rate of the pump.

In some embodiments, the method may further comprise opening the proportional valve based on a compliance value, so as to pass a part of the flow of gas output by the pump to the atmosphere.

In some embodiments, the output flow rate of the pump is fixed.

In other embodiments, the method may further comprise controlling the pump to adjust the output flow rate of the pump.

In some embodiments, the valve may be a proportional valve, and the method may further comprise receiving the flow of gas output by the pump at a gas reservoir; providing, by the gas reservoir, a flow of gas via the valve to the outlet when the valve is opened, and controlling the flow resistance of the proportional valve to provide a flow of gas to the outlet at the required flow rate.

In some embodiments, the method may further comprise determining the required flow rate based on at least one of a rate of change of pressure in the cuff and a compliance value.

In some embodiments, the method may further comprise selecting deflating the cuff through a release valve which is in fluid communication with the inflatable cuff.

According to a fourth aspect, there is provided a computer program product comprising a computer readable medium having computer readable code embodied therein, the computer readable code being configured such that, on execution by a suitable computer, processor or control unit, the computer, processor or control unit is caused to perform the method according to the third aspect.

In some embodiments the suitable computer, processor or control unit is connected to, or is connectable to, the plurality of pumps.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF EMBODIMENTS

As described above, measuring the blood pressure (BP) of a subject during inflation of a cuff, rather than during deflation of the cuff from a peak pressure that is sufficient to prevent blood flower in the limb, allows the BP measurement to be completed more quickly, which helps to improve the comfort of the BP measurement for the subject. As part of this measurement process, the cuff should be inflated to the required pressure at a dedicated inflation rate, and the inflation apparatus described in the following provides a flexible solution relating to inflation-based BP measurements that is suitable for a large range of different cuff sizes and materials, without the need for complex adjustments to the pump or introduction of complicated control procedures. As is known, a cuff can be placed or wrapped around a part of a body of a subject and the cuff inflated to apply pressure to the body part underneath the cuff.

Figure 1:
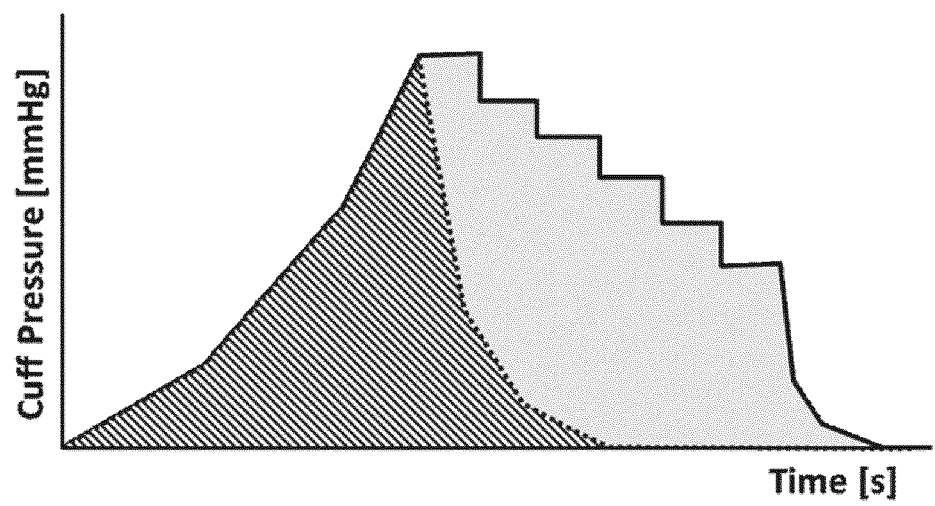
FIG. 1 is a graph of cuff pressure versus time measured for a conventional auscultatory or oscillometric NIBP measurement apparatus and for an inflation-based NIBP measurement apparatus.
Figure 2:
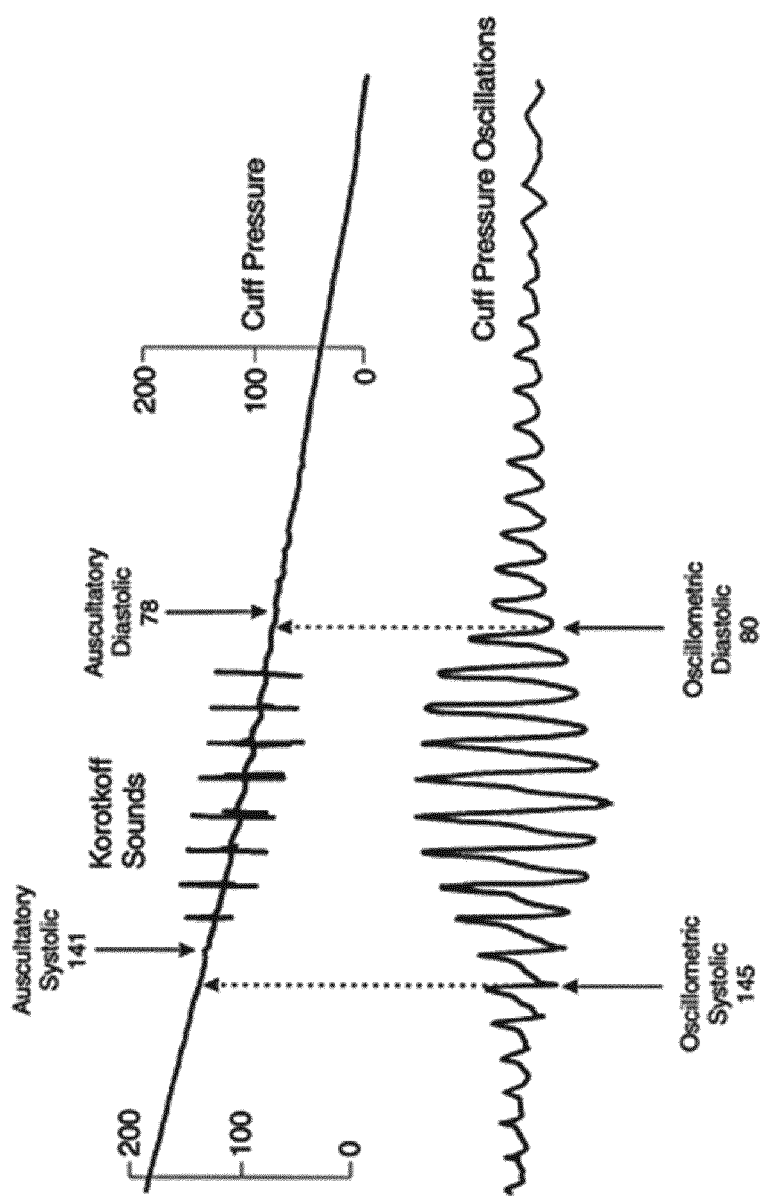
FIG. 2 is another graph of cuff pressure versus time for a conventional auscultatory or oscillometric NIBP measurement apparatus.
Figure 3:
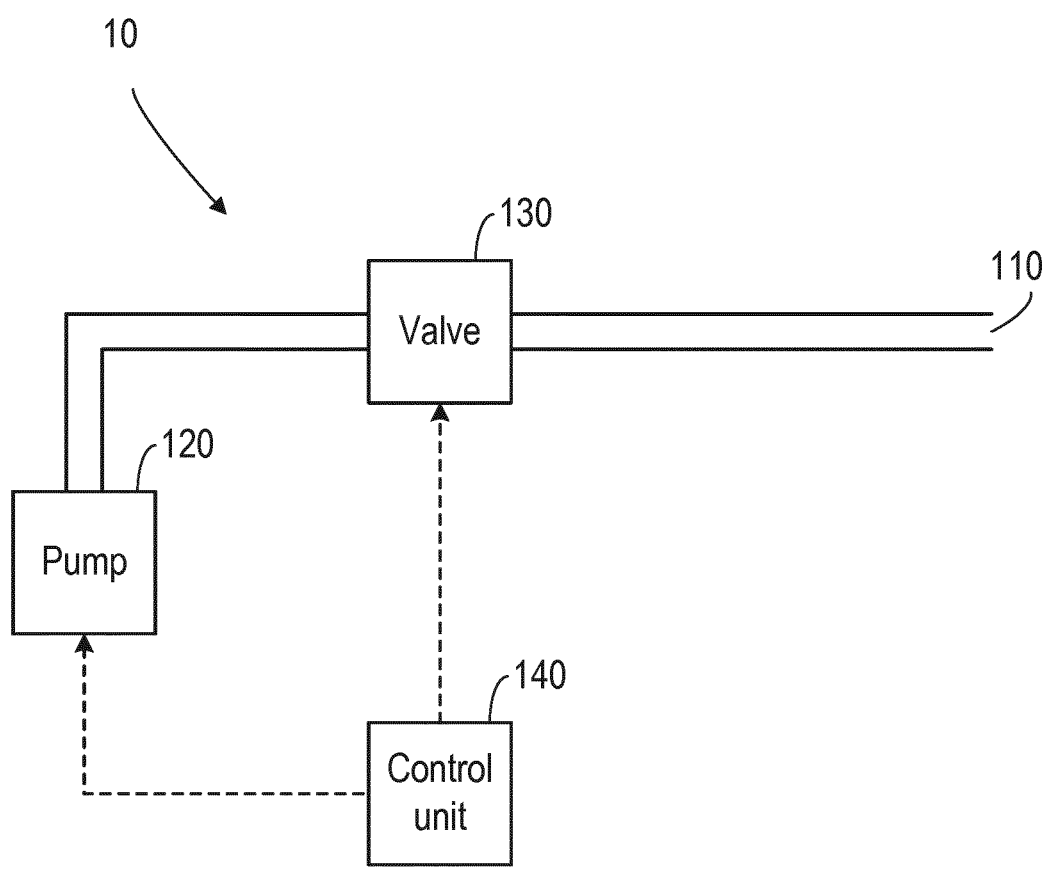
FIG. 3 is a diagram of an inflation apparatus according to an embodiment of the invention.

An inflation apparatus for use in or with an inflation-based non-invasive blood pressure (NIBP) measurement apparatus according to an embodiment of the invention is shown in FIG. 3. The inflation apparatus 10 is for providing a flow of gas to a cuff used with the inflation-based NIBP measurement apparatus at a required or desired flow rate. Thus the inflation apparatus 10 comprises an outlet 110, a pump 120, and a valve 130 disposed along a flow path between the pump 120 and the outlet 110. A control unit 140 is connected to at least one of the pump 120 and the valve 130 to control the operation of at least one of these components. The control unit 140 controls at least one of the pump 120 and the valve 130 based on a required flow rate at the outlet 110.

The required flow rate may be determined based on at least one of a required rate of change of pressure in the cuff and a compliance value. The compliance value can be an overall compliance value that can be a combination of the compliance of the cuff, the compliance of the arm and of the wrapping of the cuff. The compliance of the cuff is defined as the rate of air flow into the cuff divided by the rate of pressure increase in the cuff. This overall compliance value is not constant, but depends on the pressure in the cuff. Thus the compliance value can be determined based on at least one of the pressure in the cuff, the size of the cuff, the elasticity of the material of the cuff, the compressibility of the tissue underneath the cuff, and the tightness of the wrapping of the cuff around the body part. The compliance value, and/or any of the factors on which the determination of the compliance value may be based on, may be determined before or during inflation of the cuff. The required flow rate can be controlled using a feedback loop based on the desired rate of change of pressure and the actual rate of change of pressure.

The outlet 110 is configured to be coupled to an inflatable cuff of the inflation-based NIBP measurement apparatus. In some embodiments, the outlet 110 is configured such that it can be detachably coupled to cuffs having different sizes, for example a regular arm cuff, a neonatal cuff and a thigh cuff.

The pump 120 is for outputting a flow of gas (e.g. air) at an output flow rate. In some embodiments, the pump 120 may be configured to output a flow of gas at a fixed flow rate, i.e. the output flow rate is fixed. In some other embodiments, the pump 120 may be configured to output gas at a variable flow rate under the control of the control unit 140. In other words, the control unit 140 may adjust the output flow rate to a rate within a range of flow rates that the pump 120 is able to output.

The valve 130 is disposed along a flow path between the pump 120 and the outlet 110, so as to selectively pass part of the flow of gas output by the pump 120. The valve 130 has a flow resistance (where the flow resistance is defined as a pressure drop over the valve divided by a flow rate through the valve). In some embodiments, the valve 130 may have a fixed flow resistance (e.g. it is a simple on/off valve with a defined flow restriction) and in other embodiments the valve 130 may have a variable flow resistance (e.g. such as a proportional valve in which the amount of opening and thus flow can be controlled gradually) that can be controlled by the control unit 140. In some embodiments, the decision on whether the valve 130 should be opened or closed during inflation of the cuff may be based on a compliance value measured before the inflation of the cuff.

In some embodiments, which are described in more detail below with reference to FIGS. 4 and 5, the valve 130 (whether with a fixed flow resistance or a variable flow resistance) can be a so-called 'leak' valve that is connected to the pump 120 such that when the valve 130 is opened a part of the flow of gas output by the pump 120 is passed to the atmosphere (and thus not passed to the cuff).

As noted above the control unit 140 controls at least one of the pump 120 and the valve 130 based on the required flow rate at the outlet 110. In particular in some embodiments the control unit 140 controls the pump 120 to adjust the output flow rate of the pump 120. In other embodiments, the control unit 140 controls the flow resistance of the valve 130. In some embodiments, the control unit 140 adjusts the output flow rate of the pump 120 and controls the flow resistance of the valve 130.

The control unit 140 can be implemented in numerous ways, with software and/or hardware, to perform the various functions described below. The control unit 140 may comprise one or more microprocessors or digital signal processor (DSPs) that may be programmed using software or computer program code to perform the required functions and/or to control components of the control unit 140 to effect the required functions. The control unit 140 may be implemented as a combination of dedicated hardware to perform some functions (e.g. amplifiers, pre-amplifiers, analog-to-digital convertors (ADCs) and/or digital-to-analog convertors (DACs)) and a processor (e.g., one or more programmed microprocessors, controllers, DSPs and associated circuitry) to perform other functions. Examples of components that may be employed in various embodiments of the present disclosure include, but are not limited to, conventional microprocessors, DSPs, application specific integrated circuits (ASICs), and field-programmable gate arrays (FPGAs).

In various implementations, the control unit 140 may be associated with or comprise one or more memory units (not shown) that comprise any type of memory, such as cache or system memory including volatile and non-volatile computer memory such as random access memory (RAM) static RAM (SRAM), dynamic RAM (DRAM), read-only memory (ROM), programmable ROM (PROM), erasable PROM (EPROM), and electrically erasable PROM (EEPROM). The control unit 140 or associated memory unit can also be used for storing program code that can be executed by a processor in the control unit 140 to perform the methods described herein.

In some embodiments, which are described below with reference to FIG. 6, the inflation apparatus 10 may further comprise a gas reservoir disposed to receive the flow of gas output by the pump 120 and to provide a flow of gas via the valve 130 to the outlet 110, and the control unit 140 may be configured to control the flow resistance of the valve 130 so as to provide a flow of gas to the outlet 110 at the required flow rate. Thus, the flow of gas output by the pump 120 is used to pressurize the gas reservoir, from which the cuff is inflated, controlled by use of the proportional valve 130 to provide the flow of gas to the outlet 110 at the required flow rate.

It will be appreciated that FIG. 3 only shows the components required to illustrate this aspect of the invention, and in a practical implementation the inflation apparatus 10 may comprise additional components to those shown. For example, the inflation apparatus 10 may comprise further valves for safety reasons, a battery or other power supply for powering the pump 120 and control unit 140, a memory module for storing program code, and/or one or more interface components that allow a user (e.g. the subject or healthcare professional) to interact with and control the inflation apparatus 10.

Figure 4:
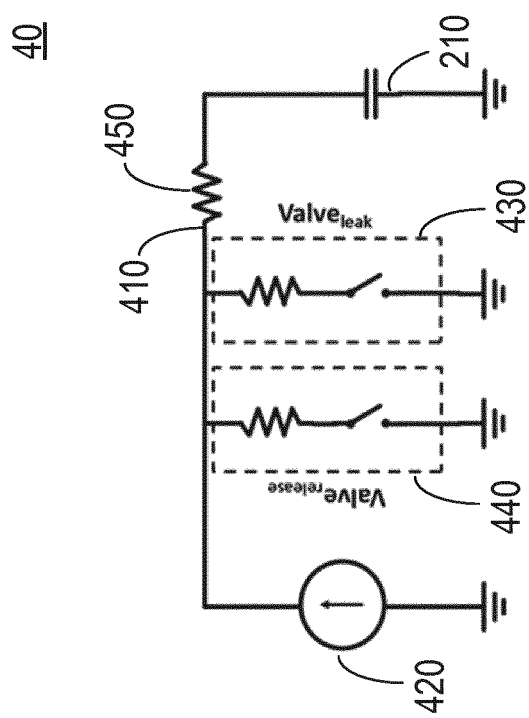
FIG. 4 shows a circuit diagram representation of an implementation of the inflation apparatus according to an embodiment of the invention in an inflation-based NIBP measurement apparatus.

FIG. 4 is a circuit diagram representation of an implementation of an inflation apparatus according to an embodiment of the invention in an inflation-based NIBP measurement apparatus. The layout of the implementation of the inflation-based NIBP measurement apparatus 40 is shown as a circuit diagram comprising connections between an outlet 410, a pump 420 and a valve 430 forming the inflation apparatus, and a release valve 440. In operation the outlet 410 is connected to a tube 450, and the tube 450 is connected to a cuff 210 so as to allow gas to pass through from the pump 420 to the cuff 210.

In the circuit diagram, the valve 430 and the release valve 440 are modelled as resistors connected to ground (e.g. the atmosphere) via respective switches (i.e. the valves allow a flow of gas there through when the switches are closed), the tube 450 is modelled as series resistance between the outlet 410 and the cuff 210, the cuff 210 is modelled as a capacitor (as it stores air or gas), and the pump 420 is modelled as a current source (as it provides air or gas into the circuit). It will be appreciated that the relative arrangements of the valve 430 and release valve 440 shown in FIG. 4 is exemplary and they can be arranged differently to that shown (e.g. the release valve 440 can be located nearer to, or be part of, the cuff 210).

The valve 430 is a leak valve that is configured to pass a part of the flow of gas output by the pump 420 to the atmosphere when the leak valve is opened. In this embodiment, the leak valve 430 has a fixed flow resistance (e.g. it is a simple on/off valve). In this embodiment, both of the first valve 430 and the second valve 440 are connected to the atmosphere so as to, respectively, release part of the flow of gas from the pump 420 to the atmosphere, and to allow deflation of the cuff 210. The opening and closing of the leak valve 430 and the release valve 440 can be controlled by a control unit (not shown in FIG. 4) in the inflation apparatus or a processor/control unit in the inflation-based NIBP measurement apparatus 40.

The pump 420 in this embodiment has a variable output flow rate that can be controlled by the control unit or processor/control unit based on a required flow rate. The control unit or processor may be configured to receive at least one of a required rate of change of pressure in the cuff 210 and a compliance value. This information may be predetermined, determined during or before the inflation of the cuff, received through a communication module (not shown in FIG. 4) at the inflation apparatus 40 from an external device, or input by a user of the apparatus 40. The control unit or processor may then be further configured to determine the required flow rate based on the received at least one of a rate of change of pressure at the cuff 210 and a compliance value, so as to control the operation of the pump 420.

If the required flow rate to the outlet 410 and ultimately to the cuff 210 can be achieved by simply operating the pump 420 to output gas at the required flow rate, then the leak valve 430 can remain closed so that no gas from the pump 420 is leaked to the atmosphere. However, when the required flow rate is lower than a minimum operable output flow rate of the pump 420, the control unit of the inflation apparatus 40 is configured to open the leak valve 430 so as to selectively pass part of the flow of gas output by the pump through the outlet 410 while passing the rest of the flow of the gas to the atmosphere, so as to achieve the required flow rate. To implement the above, the control unit may be further configured to determine whether the required flow rate is lower than the minimum flow rate of the pump 420, and if so to determine the required output flow rate so that the flow of gas at the outlet 410 is at the required flow rate. That is, the control unit can set the output flow rate of the pump 420 to an output flow rate such that the difference between the output flow rate and the flow rate of gas to the atmosphere when the leak valve 430 is opened is equal to (or approximately equal to) the required flow rate.

Alternatively, the leak valve 430 can be controlled by the control unit of the inflation apparatus 40 based on a compliance value. For example, the control unit of the inflation apparatus 40 may be configured to compare the compliance value with a predetermined threshold so as to determine whether to open or close the leak valve 430. The pump 420 can then be operated to output gas based on whether the leak valve 430 is opened or closed.

If the leak valve 430 is opened, the pump 420 is controlled so as to output gas at a flow rate Fp that is equal to the required output flow rate F (=C×R) plus the flow rate Fl through the leak valve 430, i.e. Fp=F+Fl. If the leak valve 430 is closed, the pump 420 is controlled so as to output gas at the required flow rate, i.e. Fp=F. The flow rate Fl through the leak valve 430 depends on pressure P and the flow resistance of the leak valve Rl, and in some embodiments the flow rate Fl through the leak valve may be represented by the equation Fl=P/Rl.

Therefore, in this embodiment, a single standard pump 420 with a range of relatively high output flow rates can be used while allowing the inflation apparatus 40 to be coupled to a large range of different-sized cuffs. For larger cuffs such as a thigh cuff, the pump 420 may be able to output relatively high flow rates to inflate the cuff at a suitable higher flow rate. For smaller cuffs such as a neonatal cuff, the pump 420 can be operated at a low output flow rate and the leak valve 430 can be opened so as to reduce the flow rate to the outlet 410 to inflate the cuff 210 at the required pressure rate change.

As the cuff 210 is being inflated, a blood pressure measurement can be made using measurements from a sensor in the NIBP measurement apparatus 40. The sensor is configured to measure arterial oscillations in the body part of the subject as the cuff 210 is being inflated. This sensor may be a pressure sensor configured to measure changes in cuff pressure resulting from the pulsation of the arterial blood in the arteries underneath the cuff. In some embodiments, the sensor may comprise a pulse rate sensor configured to measure the pulse rate of the subject during the inflation. In some embodiments, the sensor may comprise a photoplethysmography (PPG) sensor, and accelerometer, or an electrocardiogram (ECG) sensor, although those skilled in the art will be aware of other types of heart rate sensor that can be used, such as a camera, a radar, an impedance cardiogram, a heart sound sensor, etc. In use, the sensor may be attached to or otherwise in contact with the appropriate part of the body of the subject in order to measure arterial oscillations or pulse rate. In some embodiments, the sensor may be integrated with the cuff so that the subject or healthcare professional only has to wrap or place the cuff around the body part in order to start using the NIBP measurement apparatus 40.

Once the sensor has completed sufficient arterial oscillation measurements for a BP measurement to be obtained, the release valve 440 can be opened so as to quickly release the pressure in the inflatable cuff 210 to minimize any discomfort caused to the subject.

The arterial oscillations measured by the sensor are then received at the control unit of the inflation apparatus or processing/control unit of the NIBP measurement apparatus 40, which is then configured to determine the blood pressure of the subject based on the received arterial oscillations measurements. For example, in some embodiments where the sensor comprises an accelerometer, the control unit or the processing unit may be configured to process acceleration signals from the accelerometer to extract the movements caused by the pulsating blood in the arteries distal from the cuff. In some embodiments, there can be a wired connection between the sensor and the control unit or the processing unit, whereas in other embodiments, the sensor can communicate with the control unit or the processing unit wirelessly.

Figure 5:
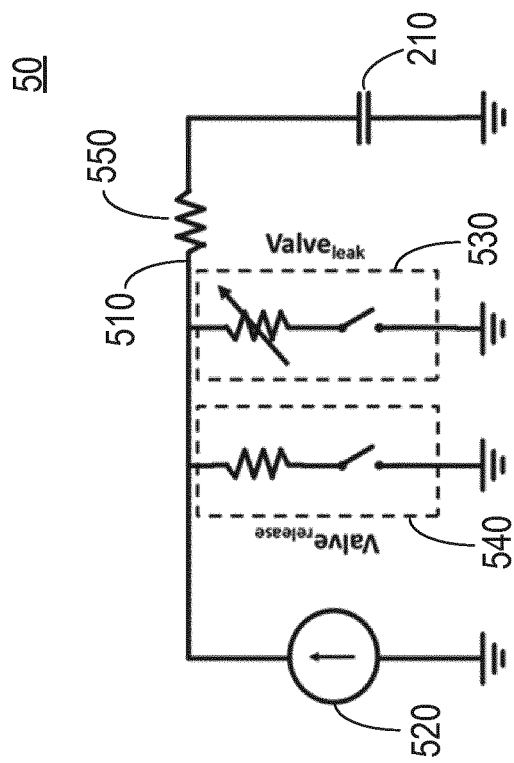
FIG. 5 shows a circuit diagram representation of an implementation of the inflation apparatus according to another embodiment of the invention in an inflation-based NIBP measurement apparatus.

FIG. 5 is a circuit diagram representation of an implementation of an inflation apparatus according to another embodiment of the invention in an inflation-based NIBP measurement apparatus. The layout of the implementation of the inflation-based NIBP measurement apparatus 50 is shown as a circuit diagram comprising connections between an outlet 510, a pump 520 and a valve 530 forming the inflation apparatus, and a release valve 540. In operation the outlet 510 is connected to a tube 550, and the tube 550 is connected to a cuff 210 so as to allow gas to pass through from the pump 520 to the cuff 210. The pump 520 in this embodiment is configured to have a fixed output flow rate to provide a flow of gas to the outlet 510, i.e. the output flow rate of the pump 520 is the same regardless of whether which size cuff 210 the inflation apparatus is being used to inflate.

In some embodiments, the fixed output flow rate can be determined from a one-time cuff compliance measurement. In some of these embodiments, the fixed output flow rate to the outlet can be determined using the formula $F=C \times R$, where F is the fixed output flow rate, C is the total compliance [mL/mmHg], and R is the desired pressure rate [mmHg/s]. The cuff compliance is large at low pressures (i.e. at the start of inflation) and gradually decreases when the cuff is inflated. Hence the required flow rate F can be determined by an initial compliance measurement of an almost empty cuff. When the cuff pressure increases, the compliance decreases and less flow is needed. This lower flow can then be regulated by partly leaking it to atmosphere using the valve 530. The desired pressure rate R may be stored in a memory of the inflation apparatus or received through a communication module.

In the circuit diagram, the valve 530 and release valve 540 are modelled as resistors connected to ground (e.g. the atmosphere) via respective switches (i.e. the valves allow a flow of gas there through when the switches are closed). The valve 530 is shown as a variable resistor indicating that the flow resistance can be adjusted. The tube 550 is modelled as series resistance between the outlet 510 and the cuff 210, the cuff 210 is modelled as a capacitor (as it stores air or gas), and the pump 420 is modelled as a current source (as it provides air or gas into the circuit). It will be appreciated that the relative arrangements of the valve 530 and release valve 540 shown in FIG. 5 is exemplary and they can be arranged differently to that shown (e.g. the release valve 540 can be located nearer to, or be part of, the cuff 210).

The valve 530 is a proportional valve that is configured to pass an increasing part of the flow of gas output by the pump 520 to the atmosphere as the flow resistance of the proportional valve 530 is reduced. This is based on the fact that cuff compliance is high at low pressures (e.g. at the start of the inflation of the cuff and cuff compliance decreases as the cuff pressure increases (e.g. as the cuff is being inflated)). In this embodiment, both of the proportional valve 530 and the release valve 540 are connected to the atmosphere so as to, respectively, release part of the flow of gas from the pump 520 to the atmosphere, and to allow deflation of the cuff 210. The flow resistance of the proportional valve 530 and the opening and closing of the release valve 540 can be controlled by a control unit (not shown in FIG. 5) in the inflation apparatus or a processor/control unit in the inflation-based NIBP measurement apparatus 50.

Moreover, the proportional valve 530 has a variable flow resistance that can be controlled by the control unit or processor/control unit, based on a required flow rate. The control unit or processor may be configured to receive at least one of a rate of change of pressure in the cuff 210 and a compliance value 210. This information may be predetermined, determined during a first part of the inflation of the cuff, received through a communication module (not shown in FIG. 5) at the inflation apparatus 50 from an external device, or input by a user of the apparatus 50. The control unit may then be further configured to determine the required flow rate based on the received at least one of a rate of change of pressure at the cuff 210 and a compliance value, so as to control the flow resistance of the first valve 530.

Since the flow resistance of the first valve 530 is controllable by the control unit and the output flow rate of the pump 520 may be fixed, the required flow rate to the outlet 510 and ultimately to the cuff 210 can be achieved by simply opening the proportional valve 530 and controlling the flow resistance of the proportional valve 530 to leak an appropriate rate of gas so that the gas that passes through to the outlet 510 is at the required flow rate. Thus, the control unit may be further configured to determine whether the required flow rate is lower than the fixed flow rate of the pump 520, and if so to determine the required flow resistance of the proportional valve 530 so that the flow of gas at the outlet 410 is at the required flow rate. That is, the control unit can set the flow resistance of the proportional valve 530 to a flow resistance such that the difference between the fixed output flow rate of the pump 520 and the flow rate of gas to the atmosphere when the proportional valve 530 is opened is equal to (or approximately equal to) the required flow rate.

Alternatively, the proportional valve 530 can be controlled by the control unit of the inflation apparatus 50 based on a compliance value. For example, the control unit of the inflation apparatus 50 may be configured to compare the compliance value with a predetermined threshold so as to determine whether to open or close the proportional valve 530. The pump 520 can then be operated to output gas based on whether the proportional valve 530 is opened or closed.

If the proportional valve 530 is opened, the pump 520 is controlled so as to output gas at a flow rate Fp that is equal to the required output flow rate F ($=C \times R$) plus the flow rate Fl through the proportional valve 530, i.e. Fp=F+Fl. If the proportional valve 530 is closed, the pump 520 is controlled so as to output gas at the required flow rate, i.e. Fp=F. The flow rate Fl through the proportional valve 530 depends on pressure P and the flow resistance of the proportional valve Rl, and in some embodiments the flow rate Fl through the proportional valve may be represented by the equation Fl=P/Rl.

Therefore, in this embodiment, a single standard pump 520 with a relatively high output flow rate should be used to allow the inflation apparatus to be coupled to a large range of different-sized cuffs. The output flow rate of the pump 520 should preferably be high enough to be used with a cuff requiring the highest flow rate for inflation. Thus, for a larger cuff, such as a thigh cuff, the proportional valve 530 may be opened with the flow resistance set to leak a small amount of the gas output by the pump 520 to achieve the required flow rate. For smaller cuffs such as a neonatal cuff, the proportional valve 530 can be controlled accordingly so as to reduce the flow rate to the outlet 510 to reduce risk of damaging the cuff or inflating the cuff too quickly.

Once the inflation of the cuff 210 and the blood pressure measurements performed during the inflation of the cuff 210 are completed (which can be as described above with reference to FIG. 4), the release valve 540 can be opened so as to release the pressure in the cuff 210 in a quick manner to minimize the discomfort caused to the subject.

In this embodiment, the fixed output flow rate of the pump 520 can be set such that the speed of the pump 520 is outside of the frequency band of oscillations, thereby keeping artefacts in the oscillation signal minimal. Specifically, in some embodiments where the pump 520 is a diaphragm pump, the fixed output flow rate of the diaphragm pump may be set such that oscillations caused by the operation of the diaphragm pump do not interfere with the frequency band of arterial oscillations.

In a further embodiment according to FIG. 5 the control unit 140 may control both the output of the pump 520 and the flow resistance of the proportional valve 530 to achieve an even larger range of gas flow at the outlet 510.

Figure 6:
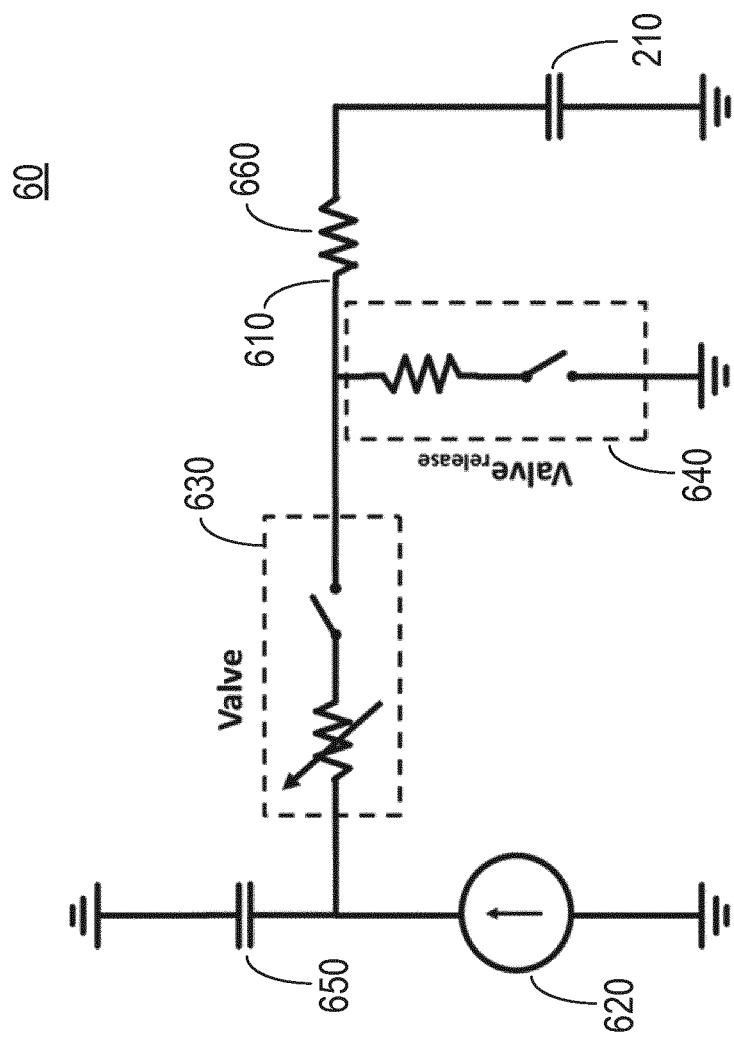
FIG. 6 shows a circuit diagram representation of an implementation of the inflation apparatus according to a further embodiment of the invention in an inflation-based NIBP measurement apparatus.

FIG. 6 is a circuit diagram representation of an implementation of an inflation apparatus according to another embodiment of the invention in an inflation-based NIBP measurement apparatus. The layout of the implementation of the inflation-based NIBP measurement apparatus 60 is shown as a circuit diagram comprising connections between an outlet 610, a pump 620, a valve 630 and a gas reservoir 650 forming the inflation apparatus, and a release valve 640. In operation the outlet 610 is connected to a tube 660, and the tube 660 is connected to a cuff 210 so as to allow gas to pass through from the gas reservoir 650, via the valve 630, to the cuff 210. The pump 620 in this embodiment is configured to have a fixed output flow rate to provide a flow of gas to the gas reservoir 650, i.e. the output flow rate of the pump 620 is the same regardless of whether which size cuff 210 the inflation apparatus is being used to inflate.

In the circuit diagram, the valve 630, release valve 640 and tube 650 are modelled as resistors, with the valve 630 connected in series with the reservoir 650 and outlet 610. The valve 630 is shown as a variable resistor indicating that the flow resistance can be adjusted, and a switch is also shown representing that the valve 630 can be opened (to allow a flow of gas there through) and closed (to prevent a flow of gas there through). The release valve 640 is connected to ground (e.g. the atmosphere) via a switch, representing the ability of the release valve 640 to be selectively opened and closed by a control unit to selectively release gas in the cuff 210 to the atmosphere. The cuff 210 and gas reservoir 650 are modelled as capacitors (as they store air or gas), and the pump 420 is modelled as a current source (as it provides air or gas into the circuit). It will be appreciated that the relative arrangements of the valve 630 and release valve 640 shown in FIG. 6 is exemplary and they can be arranged differently to that shown (e.g. the release valve 640 can be located nearer to, or be part of, the cuff 210).

The pump 620 is used to pressurize the gas reservoir 650. The valve 630 is a proportional valve that is configured to allow gas stored in the gas reservoir 650 to flow at variables rates to the outlet 610 when the flow resistance of the proportional valve 530 is adjusted. In this embodiment, the proportional valve 630 is disposed between the pump 620 and the gas reservoir 650 on one side and the outlet 610 on the other side. As such, when the flow resistance of the proportional valve 630 is adjusted, a flow of gas at variable rates can flow from the gas reservoir 650 to the cuff 210 through the outlet 610. Moreover, the proportional valve 630 has a variable flow resistance that can be controlled by the control unit or a processor/control unit, based on a required flow rate. The control unit or processor may be configured to receive at least one of a rate of change of pressure in the cuff 210 and a compliance value. This information may be determined before or during the inflation of the cuff, received through a communication module (not shown in FIG. 6) at the inflation apparatus 60 from an external device, or input by a user of the apparatus 60. The control unit may then be further configured to determine the required flow rate based on the received at least one of a rate of change of pressure at the cuff 210 and a compliance value, so as to control the flow resistance of the proportional valve 630. The control unit may be further configured to switch the pump 620 off when the pressure in the reservoir 650 exceeds a predetermined pressure level and to switch the pump 620 on when the pressure in the reservoir 650 falls below another predetermined pressure level.

Since the flow resistance of the proportional valve 630 is controllable by the control unit and the output flow rate of the pump 620 is fixed, the required flow rate to the outlet 610 and ultimately to the cuff 210 can be achieved by simply controlling the flow resistance of the proportional valve 630 so that at least a part of the gas that is stored in the gas reservoir 650 is output by the gas reservoir 650 and passes towards the outlet 610 at the required flow rate. The control unit may be further configured to determine the required flow rate at the outlet 610 and set the flow resistance of proportional valve 630 so that the flow of gas through the valve 630 is at the required flow rate.

Therefore, in this embodiment, a single standard pump 620 with a relatively high output flow rate and/or a gas reservoir with a relatively high capacity should be used to allow the inflation apparatus to be coupled to a large range of different-sized cuffs. For larger cuffs such as a thigh cuff, the proportional valve 630 can be controlled accordingly to allow a higher flow rate to the outlet 610 to inflate the cuff. For smaller cuffs such as a neonatal cuff, the first valve 630 can be controlled accordingly to allow a lower flow rate to the outlet 610 to inflate the cuff.

Once the inflation of the cuff 210 and the blood pressure measurements performed during the inflation of the cuff 210 are completed (which can be as described above with reference to FIG. 4), the release valve 640 can be opened so as to release the pressure in the cuff 210 in a quick manner to minimize the discomfort caused to the subject.

Figure 7:
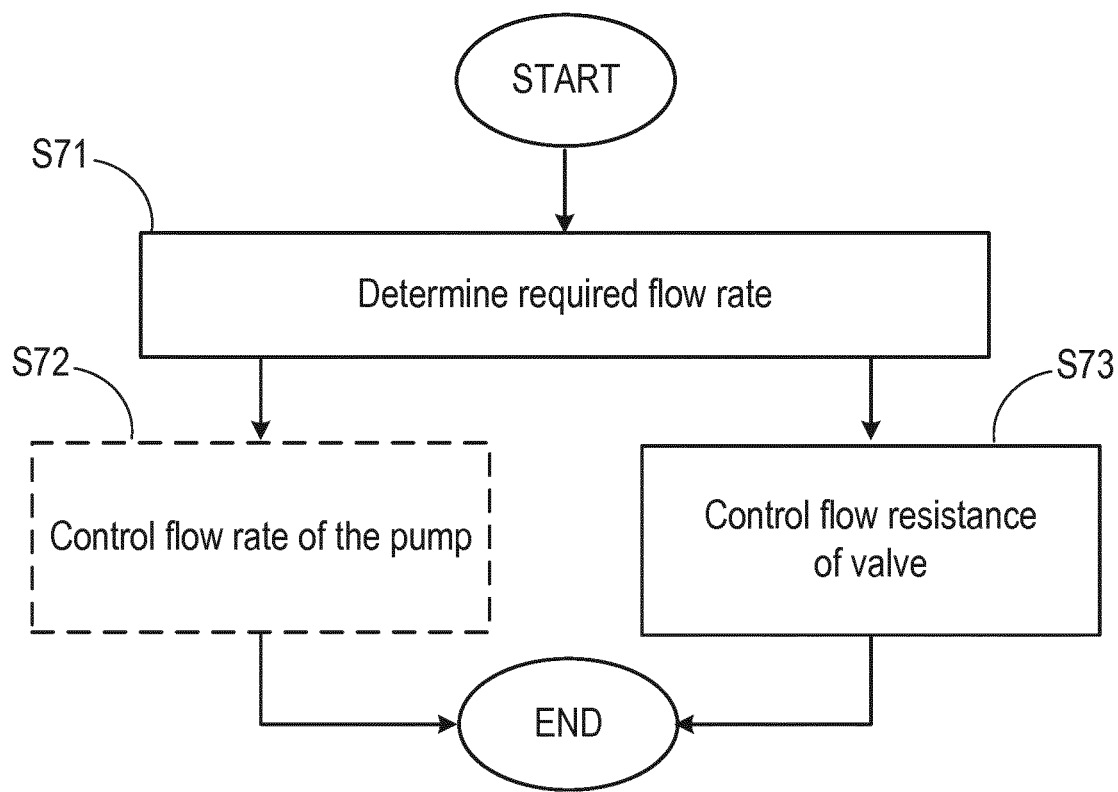
FIG. 7 is a flow chart illustrating an exemplary method for operating an inflation apparatus according to an embodiment of the invention.

The flow chart in FIG. 7 illustrates an exemplary method for controlling an inflation apparatus for use with an inflation-based NIBP measurement apparatus. This method can be implemented by an inflation apparatus as shown in any of FIGS. 3-6, and it will be appreciated that in some embodiments the inflation apparatus 10 can comprise computer program code for enabling the control unit 140 to perform the method.

In the first step S71, which is optional, a required flow rate for a cuff can be determined. This required flow rate may be predetermined or preset for a particular cuff, but in other embodiments it can be determined based on at least one of a rate of change of pressure and a compliance value. This information (whether the required flow rate, the rate of change of pressure for the cuff and/or the compliance value) may be received at the control unit 140 of the inflation apparatus 10 from an external device, such as a remote computer or a remote memory, or be input by a user of the apparatus 10. In some embodiments, as noted above, the compliance value changes with changes in the pressure in the cuff, and thus the compliance value is determined during the inflation of the cuff and the required flow rate determined/updated as necessary.

Depending on a configuration of the inflation apparatus 10 (e.g. as shown in FIG. 4, 5 or 6 above), the method then proceeds to step S73, or proceeds to both of step S72 and step S73. If the inflation apparatus 10 comprises a pump 120 that has a variable output flow rate that is controllable by the control unit 140 and a valve 130 that has a fixed flow resistance (e.g. as in FIG. 3), the method proceeds to both steps S72 and S73. If the inflation apparatus 10 comprises a pump 130 that has a fixed output flow rate and a valve that has a variable flow resistance controllable by the control unit 140, the method proceeds to S73. In embodiments where both the output flow rate of the pump 120 is variable and the flow resistance of the valve 130 is variable, the method can proceed to both steps S72 and S73.

In step S72, the flow rate of the pump is controlled so as to provide a flow of gas to the outlet 110 at the required flow rate for inflating the cuff. If the required flow rate is within a range of the operable flow rates of the pump 120 of the apparatus 10, then the control unit 140 controls the output flow rate of the pump 120 to be the required flow rate and closes the valve 130 so that no gas is leaked to the atmosphere. However, if the required flow rate is lower than a minimum operable flow rate of the pump 120, then the control unit 140 controls the output flow rate of the pump 120 to be a suitable flow rate and controls the valve 130 to open to leak some of the flow of gas output by the pump 120 to the atmosphere, thereby providing a gas flow at the required rate to the outlet 110 (and thus to a cuff). In some other embodiments, the opening and/or closing of the valve 130 may be based on a compliance value. In these embodiments, the pump 120 may then be operated to output gas based on whether the valve 130 is opened or closed.

In step S73, a flow resistance of the valve 130 is controlled so as to provide a flow of gas to the outlet 110 at the required flow rate. For example, for an arrangement in which the output flow rate of the pump 120 is fixed and the valve 130 is configured to leak a part of the flow of gas from the pump 120 to the atmosphere while the rest of the flow of gas passes to the outlet 110, e.g. as illustrated in FIG. 5 (valve 530), the flow resistance of the valve 130 is controlled and the valve 130 opened so that an appropriate amount of the gas output by the pump 120 (at the fixed output flow rate) is leaked resulting in a flow of gas to the outlet 110 at the required flow rate. In some other embodiments, the control of the flow resistance of the valve 130 may be based on a compliance value measured before the inflation of the cuff.

As noted above, in some embodiments, the inflation apparatus 10 may comprise a pump 120 that has a variable output flow rate and a valve 130 that has a variable flow resistance. In this case, both the flow resistance of the valve 130 and the output flow rate of the pump 120 can be controlled to achieve the required flow rate in line with the embodiments shown in FIGS. 4 and 5.

In embodiments where the inflation apparatus 10 comprises a gas reservoir and a variable flow resistance valve 130, the method proceeds from step S71 to step S73 in which the flow resistance of the valve 130 is controlled to provide a flow of gas from the gas reservoir/pump 120 to the outlet 110 at the required flow rate when the valve 130 is opened.

In some embodiments, the required flow rate may be a predetermined value for example one that is provided by a manufacturer of the inflation-based NIBP measurement apparatus or a cuff for use in the NIBP measurement apparatus, or a value that is determined at another entity, e.g. a separate device. In other embodiments, the required flow rate can be determined based on at least one of a required rate of change of pressure in the cuff or a compliance value.

Thus, in this method, the required flow rate into the inflatable cuff of the inflation-based NIBP measurement apparatus is achieved by controlling a flow rate of the pump 120 and/or the flow resistance of the valve 130 disposed along the flow path between the pump 120 and the outlet 110.

There is therefore provided an inflation apparatus for an inflation-based NIBP measurement apparatus and a method of operating the same that allows a cuff to be inflated according to a desired or required flow rate so as to suit a large range of different cuff sizes and materials and/or to prevent inducing oscillation artefacts, without having to modify the components of the pump or to implement intricate control techniques.

While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An inflation apparatus for use with an inflation-based non-invasive blood pressure (NIBP) measurement apparatus, the inflation apparatus comprising:
   an outlet configured to be coupled to a cuff of the inflation-based NIBP measurement apparatus;
   a pump configured to output a flow of gas at an output flow rate;
   a valve disposed along a flow path between the pump and the outlet to selectively pass part of the flow of gas output by the pump to the atmosphere during inflation of the cuff; and
   a processor configured to: control a flow resistance of the valve to provide a flow of gas to the outlet at a required output flow rate for inflating the cuff, wherein the control of the flow resistance comprises determining when the flow of gas is lower than a minimum output flow rate of the pump, and determining the required output flow rate of the pump so that the flow of gas at the outlet is at the required flow rate for inflating the cuff.

2. The inflation apparatus according to claim 1,
   wherein the valve is a leak valve, and
   the processor is further configured to control: (i) a switching of the leak valve, and (ii) the pump to adjust the output flow rate of the pump to provide a flow of gas to the outlet at the required flow rate.

3. The inflation apparatus according to claim 2, wherein the processor is further configured to open the leak valve when the required flow rate is lower than the minimum flow rate of the pump, so as to pass a part of the flow of gas output by the pump to the atmosphere.

4. The inflation apparatus according to claim 2, wherein the processor is further configured to open the leak valve based on the compliance value, so as to pass a part of the flow of gas output by the pump to the atmosphere.

5. The inflation apparatus according to claim 1,
   wherein the valve is a proportional valve that is configured to pass a part of the flow of gas output by the pump to the atmosphere when the proportional valve is opened, and
   wherein the processor is further configured to control the flow resistance of the proportional valve to provide a flow of gas to the outlet at the required flow rate.

6. The inflation apparatus according to claim 5, wherein the processor is further configured to:

control the flow resistance of the proportional valve so as to provide a flow of gas to the outlet at the required flow rate.

7. The inflation apparatus according to claim 5, wherein the processor is further configured to open the proportional valve based on the compliance value, so as to pass a part of the flow of gas output by the pump to the atmosphere.

8. The inflation apparatus according to claim 5, wherein the output flow rate of the pump is fixed.

9. The inflation apparatus according to claim 5, wherein the processor is further configured to control the pump to adjust the output flow rate of the pump.

10. The inflation apparatus according to claim 1, wherein the required flow rate is determined based on at least one of a rate of change of pressure in the cuff and the compliance value.

11. The inflation apparatus according to claim 1, further comprising a release valve in fluid communication with the inflatable cuff for selectively deflating the cuff.

12. An inflation-based non-invasive blood pressure (NIBP) measurement apparatus comprising:
    an inflation apparatus comprising:
        an outlet configured to be coupled to a cuff of the inflation-based NIBP measurement apparatus;
        a pump configured to output a flow of gas at an output flow rate;
        a valve disposed along a flow path between the pump and the outlet to selectively pass part of the flow of gas output by the pump to the atmosphere during inflation of the cuff;
        a processor configured to: control a flow resistance of the valve to provide a flow of gas to the outlet at a required output flow rate for inflating the cuff based on a compliance value measured before or during the inflation of the cuff, wherein the control of the flow resistance comprises determining when the flow of gas is lower than a minimum output flow rate of the pump, and determining the required output flow rate of the pump so that the flow of gas at the outlet is at the required flow rate for inflating the cuff; and
        a sensor configured to measure arterial oscillations in a body part of a subject when, in operation, the cuff is positioned around the body part, with the cuff being coupled to the outlet of the inflation apparatus and being inflated by the inflation apparatus;
    wherein the processor is a processor of the inflation apparatus or a processor in the inflation-based NIBP measurement apparatus is configured to receive measurements of arterial oscillations from the sensor and to determine the blood pressure of the subject based on the received measurements.

13. A method of controlling an inflation apparatus for use with an inflation-based non-invasive blood pressure (NIBP) measurement apparatus, the method comprising:
    outputting, via a pump, a flow of gas at an output flow rate;
    selectively passing part of the flow of gas output to the atmosphere during inflation of a cuff of the inflation-based NIBP measurement apparatus via a valve disposed along a flow path between the pump and an outlet, wherein the outlet is configured to be coupled to the cuff of the inflation-based NIBP measurement apparatus; and
    controlling, via a processor, a flow resistance of the valve to provide a flow of gas to the outlet at a required output flow rate for inflating the cuff, wherein the control of the flow resistance comprises determining when the flow of gas is lower than a minimum output flow rate of the pump, and determining the required output flow rate of the pump so that the flow of gas at the outlet is at the required flow rate for inflating the cuff.

14. A tangible, non-transitory computer readable medium comprising computer readable code, which when executed by a processor, causes the processor to:
    control a flow resistance based on a compliance value measured before or during inflation of a cuff to provide a flow of gas between a pump and an outlet at a required flow rate to inflate a cuff via a valve disposed along a flow path between the pump and the outlet, wherein the control of the flow resistance comprises determining when the flow of gas is lower than a minimum output flow rate of the pump, and determining the required output flow rate of the pump so that the flow of gas at the outlet is at the required flow rate for inflating the cuff.

15. The tangible, non-transitory computer readable medium of claim 14, wherein: the valve is a leak valve that is configured to pass a part of a flow of gas output by the pump to the atmosphere when the leak valve is opened; a flow resistance of the leak valve is fixed; and the computer readable code, when executed by the processor further causes the processor to control: (i) a switching of the leak valve, and (ii) the pump to adjust an output flow rate of the pump to provide a flow of gas to the outlet at the required flow rate.

16. The tangible, non-transitory computer readable medium of claim 15, wherein computer readable code, when executed by the processor further causes the processor to open the leak valve when the required flow rate is lower than the minimum flow rate of the pump, to pass a part of the flow of gas output by the pump to the atmosphere.

17. The tangible, non-transitory computer readable medium of claim 15, wherein computer readable code, when executed by the processor further causes the processor to open the leak valve based on the compliance value, so as to pass a part of the flow of gas output by the pump to the atmosphere.

18. The tangible, non-transitory computer readable medium of claim 14, wherein:
    the valve is a proportional valve that is configured to pass a part of a flow of gas output by the pump to the atmosphere when the proportional valve is opened, and
    the computer readable code further causes the processor to control the flow resistance of the proportional valve to provide a flow of gas to the outlet at the required flow rate.

19. The tangible, non-transitory computer readable medium of claim 18, wherein computer readable code, when executed by the processor further causes the processor to:
    control the flow resistance of the proportional valve so as to provide a flow of gas to the outlet at the required flow rate.

20. The tangible, non-transitory computer readable medium of claim 18, wherein computer readable code, when executed by the processor further causes the processor to open the proportional valve based on the compliance value, to pass a part of the flow of gas output by the pump to the atmosphere.

* * * * *